Patented Mar. 9, 1937

2,073,002

UNITED STATES PATENT OFFICE 2,073,002

CELLULOSE ETHER RECOVERY

William R. Collings and Walter J. Le Fevre, Midland, Mich., assignors to The Dow Chemical Company, Midland, Mich., a corporation of Michigan No Drawing. Application March 6, 1936, Serial No. 67,419

8 Claims. (Cl. 260—152)

This invention relates to the separation of the lower alkyl ethers of cellulose from the product obtained by the etherification of alkali cellulose.

The etherification of alkali cellulose with agents such as methyl or ethyl halides produces a reaction product containing cellulose ether, some unreacted etherifying agent, the alcohol and ether corresponding to the etherifying agent, and alkali halide. It is an object of the invention to provide a method of separating quantitatively the cellulose ether from the above-described reaction product in a simple and economical manner.

We have now found that the cellulose ether can be separated readily according to the following procedure: The reaction product from the etherification step is admixed with water maintained at its boiling point under the pressure employed. In this manner the cellulose either is precipitated at once in the hot water. The suspension is then led into an expansion chamber where the unreacted etherifying agent and the alcohol and ether of the etherifying reagent flash distill from the suspension. This leaves in the expansion chamber an aqueous suspension of the cellulose ether in an alkali halide solution, which may then readily be filtered in a rotary or centrifugal filter or other suitable apparatus wherein the cellulose ether can be washed free of salt solution with hot distilled water and obtained in a relatively pure state.

Our process is particularly applicable to the separation of ethyl cellulose from the product produced by reacting alkali cellulose with an ethylating agent such as ethyl chloride. In carrying out this reaction it is customary to use an excess of ethyl chloride over that which will react with the alkali cellulose, so that the reaction product contains unreacted ethyl chloride, as well as considerable ethyl alcohol and ethyl ether. The ethylation reaction is normally carried out at temperatures of 110°–140° C. under pressures of 225 to 250 pounds gauge. According to our procedure the reaction product is conveniently discharged from the ethylator under pressure into a moving current of a steam-hot water mixture having sufficient available heat content to vaporize the volatile constituents therefrom, and in quantity sufficient to keep the alkali halide in solution. The mixing of the ethylator discharge with the hot water-steam mixture is preferably carried out in a relatively small chamber, in which the ingredients are in a state of violent agitation, by forcing the discharge through a perforated pipe, thereby accomplishing the precipitation of the cellulose ether in a finely divided condition. The cellulose ether suspension is then led into a larger chamber in which the volatile ethyl chloride, ethyl alcohol, and ethyl ether, flash distill from the mixture, leaving the cellulose ether in suspension in aqueous sodium chloride liquor. This aqueous suspension is then filtered in suitable apparatus wherein it can be washed thoroughly with hot distilled water to get out the last traces of salt.

The following example is illustrative of the practice of our invention:

A reactor was charged with 262 pounds of alkali cellulose containing 27.2 per cent of cellulose, 54.6 per cent of sodium hydroxide, 18.2 per cent of water. To this was added 1000 pounds of ethyl chloride. The ethylation of the cellulose was accomplished by maintaining the reaction mixture at 115° C., under a pressure of approximately 225 pounds gauge, for about 12 hours. At the end of this time, the reactor contents were fed through a perforated pipe at a uniform rate over a period of thirty minutes into a steam-water mixture at a temperature of 120° C. under a pressure of 40 pounds gauge. This caused the ethyl cellulose to be precipitated in the water in the form of snow-white, spongy threads not generally longer than one-eighth of an inch and approximately one-fiftieth of an inch in diameter. The aqueous suspension of the precipitated ethyl cellulose was then led into an expansion chamber wherein the unreacted ethyl chloride, ethyl ether, and ethyl alcohol were flashed off. The temperature of the vapors leaving the expansion chamber was 105°–110° C. under a pressure of 5–15 pounds gauge. The quantity of water and steam used to precipitate the cellulose was approximately 700 gallons of water preheated to 80° C., and about 630 pounds of steam under a pressure of 40 pounds gauge. The vapors from the expansion chamber were run through a first condenser which cooled them to a temperature of about 75°–85° C., thereby condensing most of the remaining alcohol and water, and thence into a second condenser to liquefy the remaining vapors. The aqueous suspension of the ethyl cellulose, which was at a temperature of 105°–110° C., was centrifuged and washed thoroughly with distilled water to remove salt. The viscosity of the finished ethyl cellulose, after drying, was 21 centipoises as measured in a 5 per cent solution in alcohol-benzene and had an ethoxyl content of 50.1 per cent.

While we have particularly described our invention with reference to ethyl cellulose, it is readily adaptable to the separation of methyl cellulose from the products of etherification reactions yielding the same.

Our method of separating cellulose ethers from the crude etherification products possesses, among others, the advantages of (1) being readily adaptable to a continuous process, (2) providing for removal of the volatile constituents and solution of the water-soluble constituents simultaneously, (3) substantially avoiding contamination of the product because of reduced precipitation time and minimum exposure to metallic surfaces, (4) requiring very simple apparatus for its practice, and (5) resulting in a very finely divided product, from which water-soluble constituents can be completely removed by washing with water.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. In a method of separating a lower alkyl ether of cellulose from the product obtained by reacting alkali cellulose with an etherifying agent at elevated temperatures under super-atmospheric pressure, the step which consists in discharging the cellulose ether-containing reaction product from the etherifying chamber into water maintained at its boiling point under the pressure employed, to precipitate the cellulose ether.

2. In a method of separating a lower alkyl ether of cellulose from the product obtained by reacting alkali cellulose with an etherifying agent at elevated temperatures under super-atmospheric pressure, the steps which consist in discharging the cellulose ether-containing reaction product from the etherifying chamber into water maintained at its boiling point under super-atmospheric pressure, to precipitate the cellulose ether, and releasing the pressure on the aqueous suspension to flash off the volatile reaction products therefrom.

3. In a method of separating a lower alkyl ether of cellulose from the product obtained by reacting alkali cellulose with an etherifying agent at elevated temperatures under super-atmospheric pressure, the steps which consist in discharging the cellulose ether-containing reaction product from the etherifying chamber under pressure into water maintained at a temperature above about 100° C., to precipitate the cellulose ether, releasing the pressure on the aqueous suspension to flash off the volatile reaction products therefrom, and separating the precipitated cellulose ether from the resulting aqueous solution.

4. In a method of separating a lower alkyl ether of cellulose from the product obtained by reacting alkali cellulose with an etherifying agent at elevated temperatures under super-atmospheric pressure, the steps which consist in discharging the cellulose ether-containing reaction product from the etherifying chamber under pressure in the form of a spray into a current of water maintained at a temperature above 100° C., leading such current into an expansion chamber to flash off volatile materials therefrom by release of pressure, recovering said volatile materials, and separating the precipitated cellulose ether from the resulting aqueous solution.

5. In a method of separating ethyl cellulose from the product obtained by reacting alkali cellulose with an ethylating agent at elevated temperatures under super-atmospheric pressure, the step which consists in discharging the ethyl cellulose-containing reaction product from the ethylating chamber under pressure into water maintained at a temperature above about 100° C., to precipitate the ethyl cellulose.

6. In a method of separating ethyl cellulose from the product obtained by reacting alkali cellulose with an ethylating agent at elevated temperatures under super-atmospheric pressure, the steps which consist in discharging the ethyl cellulose-containing reaction product from the ethylating chamber under pressure into water maintained at a temperature above about 100° C., to precipitate the ethyl cellulose, and releasing the pressure on the aqueous suspension to flash off the volatile reaction products therefrom.

7. In a method of separating ethyl cellulose from the product obtained by reacting alkali cellulose with an ethylating agent at elevated temperatures under super-atmospheric pressure, the steps which consist in discharging the ethyl cellulose-containing reaction product from the ethylating chamber under pressure into water maintained at a temperature above about 100° C., to precipitate the ethyl cellulose, releasing the pressure on the aqueous suspension to flash off the volatile reaction products therefrom, and separating the precipitated ethyl cellulose from the resulting aqueous solution.

8. In a method of separating ethyl cellulose from the product obtained by reacting alkali cellulose with an ethylating agent at elevated temperatures under super-atmospheric pressure, the steps which consist in discharging the cellulose ether-containing reaction product from the ethylating chamber under pressure in the form of a spray into a current of water maintained at a temperature above 100° C., leading such current into an expansion chamber to flash off volatile materials therefrom by release of pressure, recovering said volatile materials, and separating the precipitated ethyl cellulose from the resulting aqueous solution.

WILLIAM R. COLLINGS.
WALTER J. LE FEVRE.